United States Patent
Boyer et al.

(10) Patent No.: US 7,567,178 B2
(45) Date of Patent: Jul. 28, 2009

(54) MOBILE COMMUNICATION DEVICE WITH INTERROGATOR TO INTERACT WITH TAGS

(75) Inventors: David Boyer, Oceanport, NJ (US); Kevin Nelson, Middletown, NJ (US)

(73) Assignee: Avaya Inc., Basking Ridge, NJ (US)

( * ) Notice: Subject to any disclaimer, the term of this patent is extended or adjusted under 35 U.S.C. 154(b) by 400 days.

(21) Appl. No.: 11/476,063

(22) Filed: Jun. 28, 2006

(65) Prior Publication Data

US 2007/0032224 A1     Feb. 8, 2007

Related U.S. Application Data

(60) Provisional application No. 60/694,241, filed on Jun. 28, 2005.

(51) Int. Cl.
*G08B 13/14*     (2006.01)
(52) U.S. Cl. .................. 340/572.1; 340/505; 340/10.1; 340/539.1; 340/539.11

(58) Field of Classification Search .................. 340/505, 340/10.1, 572.1, 539.1, 539.11
See application file for complete search history.

(56) References Cited

U.S. PATENT DOCUMENTS

| | | | | |
|---|---|---|---|---|
| 6,957,393 | B2* | 10/2005 | Fano et al. | 715/747 |
| 7,079,008 | B2* | 7/2006 | Castle et al. | 340/10.1 |
| 7,149,503 | B2* | 12/2006 | Aarnio et al. | 455/414.1 |
| 2002/0133545 | A1* | 9/2002 | Fano et al. | 709/203 |
| 2003/0030543 | A1* | 2/2003 | Castle et al. | 340/5.74 |
| 2006/0053378 | A1* | 3/2006 | Fano et al. | 715/747 |

* cited by examiner

*Primary Examiner*—Daryl Pope
(74) *Attorney, Agent, or Firm*—Muncy, Geissler, Olds & Lowe, PLLC

(57) ABSTRACT

A mobile communication device interrogates a tag on nearby communication-type equipment and in cooperation with a remote server causes a communication to be forwarded to the equipment. The mobile communication device may also interrogate a nearby tag and receive information from a remote server concerning a nearby object or activity.

20 Claims, 6 Drawing Sheets

TRANSFER CALL TO:
1) LOCAL LAND LINE 703-000-1111
2) LOCAL LAND LINE 703-000-2222
3) CANCEL
PLEASE SELECT 1, 2 OR 3

FIG. 5

PRINTOUT EMAIL TO:
1) HP4 - LOC 102-B
2) EPSON 2 COLOR - LOC 103-A
3) XEROX COPIER - LOC 102-A
4) CANCEL
PLEASE SELECT 1, 2, 3 OR 4

FIG. 6

PRINTOUT EMAIL TO:
1) EAST SIDE COLOR PRINTER
2) EAST SIDE B&W PRINTER
3) CANCEL
PLEASE SELECT 1, 2 OR 3

*FIG. 8*

A CHARGE OF $4.50 WILL BE CHARGED TO YOUR VISA CARD ON FILE. DO YOU WISH TO PROCEED?
1) YES
2) NO
PLEASE SELECT 1 OR 2

*FIG. 9*

DO YOU WISH TO DOWNLOAD INFORMATION ABOUT:
1) THE HONDA ODYSSEY
2) THE HONDA CIVIC
3) THE HONDA ACCORD
4) THE HONDA PILOT
5) CANCEL
PLEASE SELECT 1, 2, 3, 4 OR 5

*FIG. 10*

MOBILE COMMUNICATION DEVICE WITH INTERROGATOR TO INTERACT WITH TAGS

This application is a conversion of provisional patent application 60/694,241, filed Jun. 28, 2005, the entire contents of which are herein incorporated by reference.

BACKGROUND OF THE INVENTION

1. Field of the Invention

The present invention relates to a mobile communication device, such as a cellular telephone. More particularly, the present invention relates to a system whereby a user carries a mobile communication device, which interrogates tags in the local environment, such that the user may route various forms of communications, e.g. telephone calls or emails, received by the mobile communication device, to equipment associated with the tag, and/or the user may receive information about objects or activities in a general vicinity of the user using the mobile communication device.

2. Description of the Related Art

Systems and methods are known in the background art for tracking the location of a mobile communication device. For example, employees may carry an RFID tag, which may be read by interrogators throughout an office building, such that the employee's location may be tracked.

Also, many cellular telephones have GPS receivers, such that the cellular telephone's location may be obtained by the service provider. Also, there are triangulation methods, whereby a cellular telephone's location may be estimated by the service provider based upon signal strength measurements.

SUMMARY OF THE INVENTION

The present inventors have appreciated drawbacks in the systems and methods of the background art.

The systems and methods in accordance with the background art track the actual location of the users. However, there is no easy way to transfer information to the user via communication type equipment (e.g. a printer, a desktop phone) located near the user, even though the user's location is known. Also, many users object to being constantly tracked as an invasion of privacy.

Applicants have appreciated a need in the art for a system and method whereby a user may utilize nearby communication-type equipment to receive information. For example, a user may printout an email received on a cellular phone on a nearby printer in a quick and easy manner. As another example, a user may obtain information about a nearby object by downloading information on a cellular telephone in a quick and easy manner.

These and other objects are accomplished by a system and method wherein a mobile communication device interrogates a tag on a nearby communication-type device and in cooperation with a remote server can cause all or a portion of a communication at the mobile communication device to be transferred, forwarded or otherwise communicated to the near-by device for printing, viewing, conferencing, etc.

These and other objects are also accomplished by a system and method wherein a mobile communication device may interrogate a nearby tag and receive information from a remote server concerning a subject associated with the nearby tag, such as information about an object to which the tag is affixed or an activity occurring in proximity of the tag.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIGS. 5-6 are examples of menu displays on the cellular telephone of FIG. 1, when used in a business environment;

FIGS. 8-10 are examples of menu displays on the cellular telephone of FIG. 1, when used in a public environment.

DETAILED DESCRIPTION OF PREFERRED EMBODIMENTS

Figure 1:
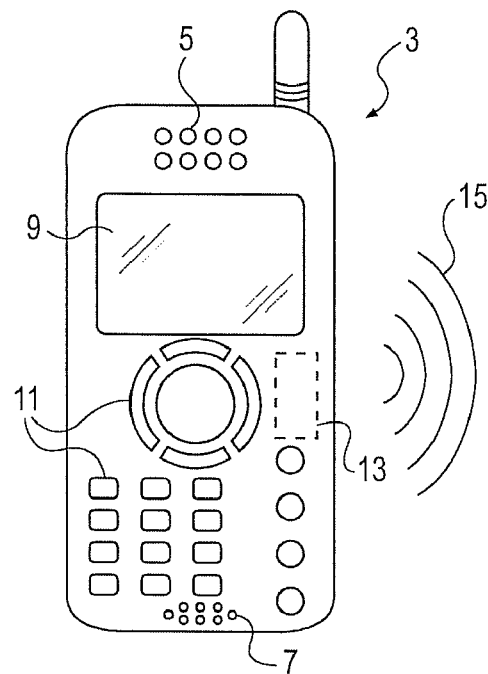
FIG. 1 is a perspective view of a cellular telephone, in accordance with the present invention.

FIG. 1 is a perspective view of a mobile communication device, such as a cellular telephone 3, in accordance with the present invention. The cellular telephone 3 includes typical structural features, such as a speaker 5, a microphone 7, a battery 8 (See FIGS. 4 and 7), a display 9 and a plurality of user input keys 11. The cellular telephone 3 also includes an interrogator 13. As can be seen in FIG. 1, the interrogator 13 is embedded within a housing of the cellular telephone 3. In the illustrated embodiment, the interrogator 13 is a radio frequency identification (RFID) scanner. Such RFID scanners transmit a signal 15 to power a passive RFID tag and read a code emitted from the RFID tag, in a known manner.

Figure 2:
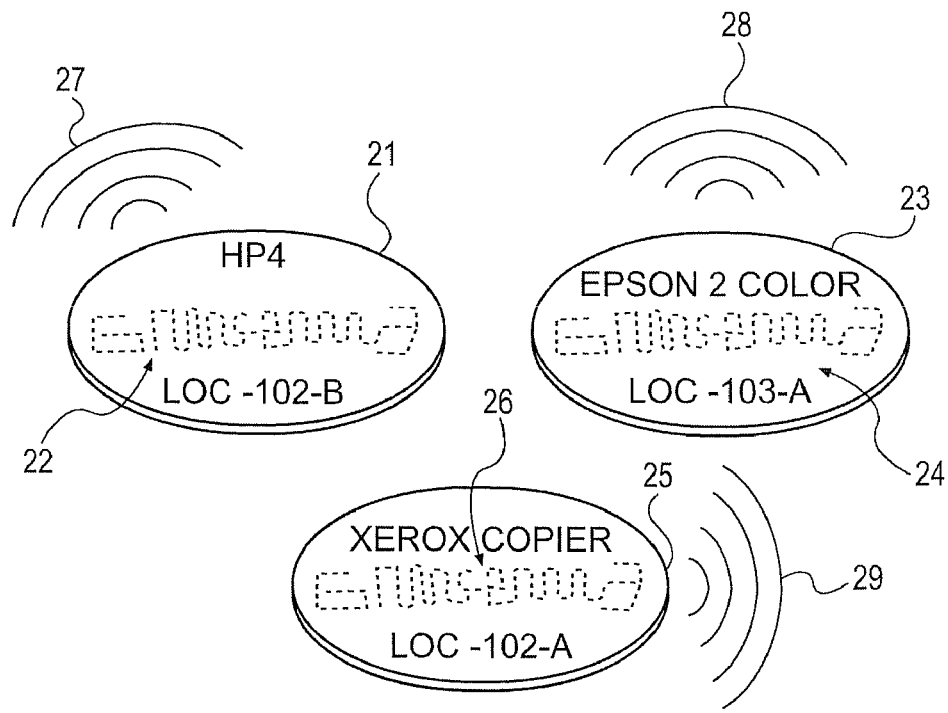
FIG. 2 is a perspective view of several different types of labels with RFID tags, in accordance with the present invention.

FIG. 2 illustrates a plurality of different labels. A first label 21, with the words "HP4, LOC-102-B" printed thereon, includes an embedded first RFID tag 22. A second label 23, with the words "EPSON 2 COLOR, LOC-103-A" printed thereon, includes an embedded second RFID tag 24. A third label 25, with the words "XEROX COPIER, LOC-102-A" printed thereon, includes an embedded third RFID tag 26. The first, second, and third RFID tags 22, 24 and 26 emit first, second and third unique codes 27, 28 and 29, respectively, when powered by an interrogator, such as the interrogator 13 of the telephone 3. The first, second and third labels 21, 23 and 25 are preferably formed of a durable material, such as plastic.

Figure 3:
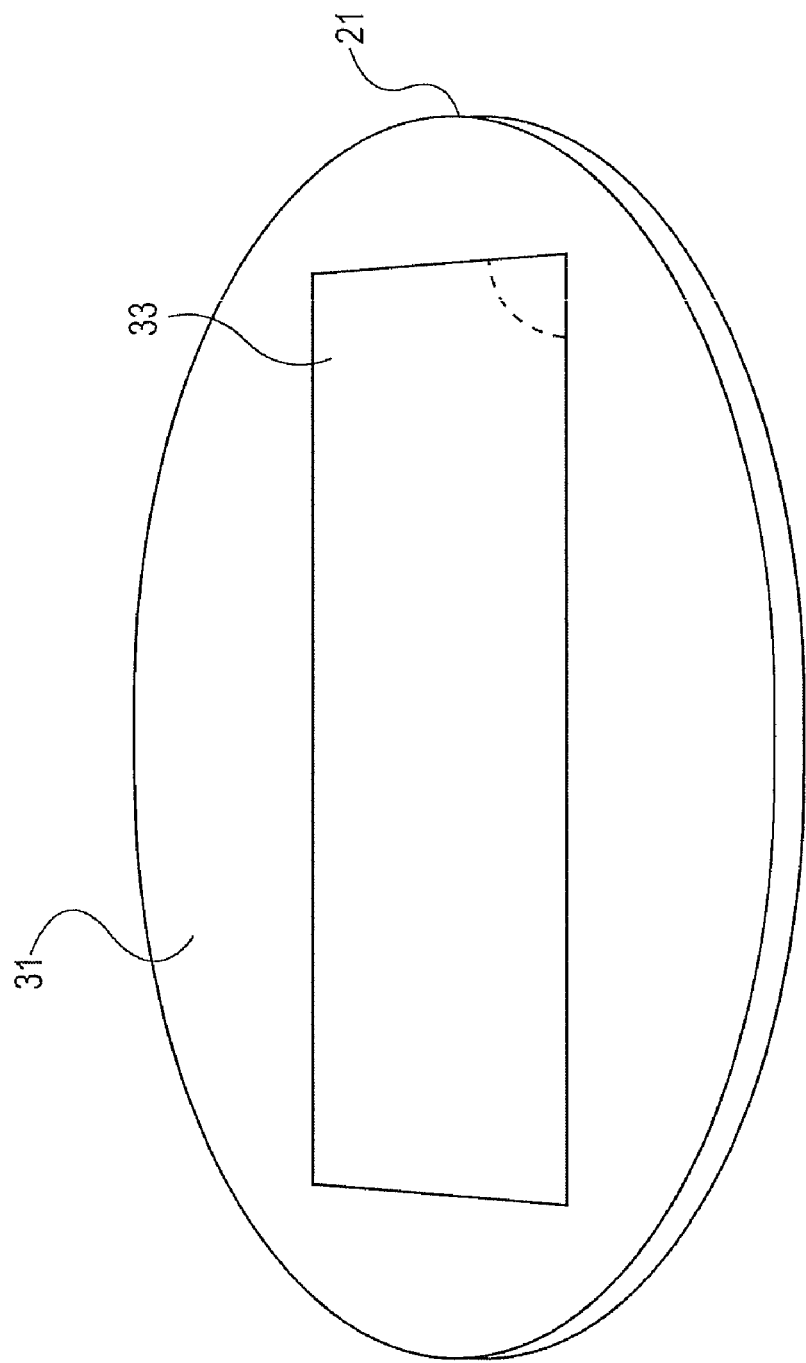
FIG. 3 is a perspective view of a backside of one of the labels of FIG. 2.

FIG. 3 illustrates a backside 31 of the first label 21. The backside 31 includes a doubled-sided adhesive tape 33, such that the first label 21 may be attached to a surface. The backsides of the second and third labels 23 and 25 are constructed in a similar manner.

BUSINESS ENVIRONMENT

Figure 4:
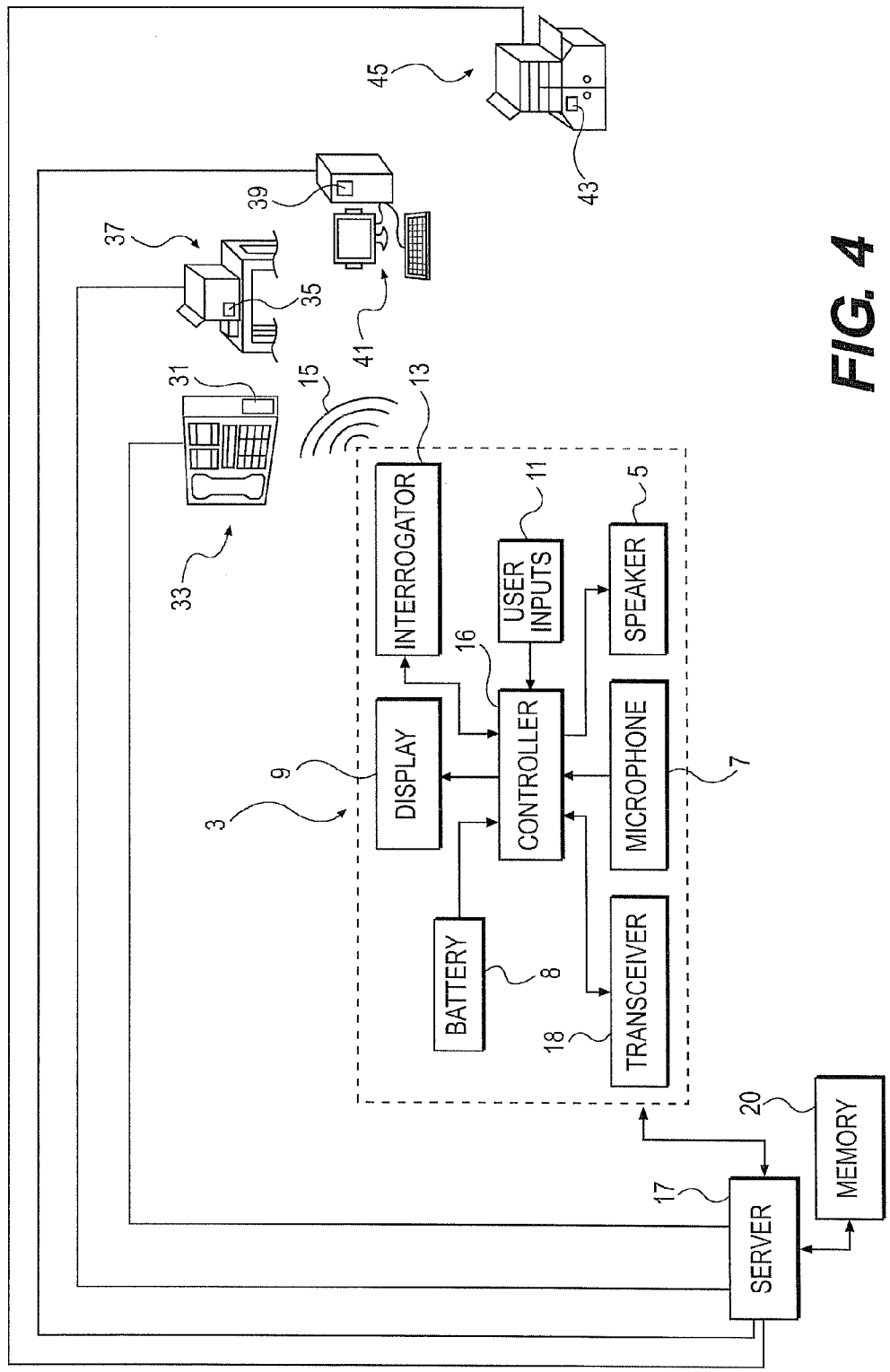
FIG. 4 is a block diagram illustrating various interacting components of the system of the present invention in a business environment.

FIG. 4 is a block diagram illustrating an interaction between the cellular telephone 3, a server 17 and various equipment that would be located in an office building environment. The RFID labels 21, 23, 25, etc. would be attached to, or located adjacent to, various pieces of equipment throughout the office building environment. For example, a first RFID label 31 would be attached to a desktop telephone 33. A second RFID label 35 would be attached to a color laser printer 37. A third RFID label 39 would be attached to a personal computer 41. A fourth RFID label 43 would be attached to a photocopier 45. Each piece of office equipment is connected to the server 17 of the business, either by a hardwired network or by a wireless network.

It is envisioned that all communication-type office equipment within the business complex would include a unique RFID label. It is already common for business owned equipment to be labeled and inventoried. Typically, each label is unique and indicates a general location of the equipment in the building complex, such as by name or bar code. The RFID tags of the present invention are consistent with this convention. Hence, the RFID tags could also be used for inventory purposes.

In operation, a user presses a designated key of the user inputs 11 of the cellular telephone 3. In response, the controller 16 powers the interrogator 13. The interrogator 13 transmits the scanning signal 15. The scanning signal 15 causes a nearby RFID tag to emit its unique code. The unique code of the nearby RFID tag 22, 24, 26 is received by the interrogator 13 and passed to the controller 16.

The controller 16 passes the unique code of the RFID tag 22, 24, 26 to a transceiver 18. The transceiver 18 passes the unique code to the server 17 via a wireless signal. The server 17 looks up the unique code in a memory 20. In the memory 20, there is a database of unique codes which are linked to relevant characteristics for the device possessing the label 21, 23, 25, such as the network address of the device, the type of device, location of the device in the office complex, last date serviced, purchase date, purchase price, etc. Once the server 17 receives the unique code, the server 17 will know the proximate location of the cellular telephone 3. Therefore, the server may track the user at that moment if desired. However, tracking is not the primary purpose of the present invention.

Now, the advantages and useful nature of the system of the present invention will be described with reference to several examples. Assume an employee receives a cellular telephone call from a customer while walking through the building complex. Assume the employee desires a better connection with the customer using a nearby corded telephone 33, e.g. to use the speaker phone ability of the corded telephone 33 for the benefit of others. In accordance with the present invention, the employee would press a "search" key of the user inputs 11 of the cellular telephone 3. The interrogator 13 would at that time obtain the unique RFID code 31 of the nearby corded telephone or telephones 33, and transmit the same to the server 17. The server 17 would check the stored data in the memory 20 to locate information about the nearby corded telephone or telephones 33. If several corded telephones 33 were located nearby, the system would send the locations/identifications of several nearby telephones to the controller 16 of the cellular telephone 3. FIG. 5 is an example of a menu, which would be displayed to the user via display 9 of the cellular telephone 3, if two local land lines were proximate the location of the user.

As can be seen in FIG. 5, the user is given the option to transfer the call to one of two local land lines. Pressing "2" on the numerical key pad of the cellular telephone 3 will cause the telephone call currently on the cellular telephone 3 to be placed on hold on the desktop telephone 33 having the telephone number 703-000-2222. The user can then answer the call on the desktop telephone 33 and terminate the telephone call on the cellular telephone 3.

The system of the present invention is a vast improvement over the possible ways of making this transfer in accordance with the systems of the background art. The employee (in the background art) would have looked for a nearby corded telephone 33, read the telephone number off of the corded telephone 33 and asked the customer to hang up and call back on the new telephone number. Another alternative would have been to ask the customer for their telephone number, ended the cellular call, and then used the corded telephone 33 to call the customer back. A third alternative would have been to place the customer on hold on the cellular telephone, activated a call forwarding command on the cellular telephone and dialed the telephone number of the nearby corded telephone 33.

All three of the systems of the background art are disruptive to the conversation in that large delays occur. Also, the user or other party to the conversation would be required to dial several numbers to accomplish the call transfer. In contradistinction, in the present invention, only two key strokes are required, i.e., the pressing of the search key and then pressing the numerical key associated with the desired land line.

Another example of the benefits of the present invention would occur with text messages. Often, users receive text messages, such as an instant messages (IM), email or fax via their mobile communication device, e.g. cellular telephone 3, BLACKBERRY, PDA, laptop computer. Often a user will desire to have an immediate printout of the text message. In accordance with the present invention, the employee would press the "search" key of the user inputs 11 of the cellular telephone 3. The interrogator 13 would at that time obtain the unique RFID code 35, 43 of the nearby printing device or devices 37, 45, and transmit the same to the server 17. The server 17 would check the stored data in the memory 20 to locate information about the nearby printing device or devices 37, 45. If several printing devices 35, 45 were located nearby, the system would send the locations/identifications of several nearby printing devices to the controller 16 of the cellular telephone 3. FIG. 6 is an example of a menu, which would be displayed to the user via display 9 of cellular telephone 3, if three printing devices were proximate the location of the user.

As can be seen in FIG. 6, the user is given the option to printout the text message using one of three printing devices. Pressing "2" on the numerical key pad of the cellular telephone 3 will cause the text message, last viewed on the cellular telephone 3, to be printed on the printing device labeled "Epson 2 Color—LOC 103-A."

The system of the present invention is a vast improvement over the systems for printing out an email from a mobile communication device in accordance with the background art. The employee (in the background art) would have needed to form a communication connection between the mobile communication device and the printing device, such as by carrying and employing a connection cable. Establishing the communication connection would be time consuming, e.g. dealing with the initialization of the software for the printing operation is often troublesome. Another alternative would have been to connect a small flash memory stick to the mobile communication device, download the text message, remove the flash memory stick, connect it to the printing device, and print out the text message. The systems of the background art are slow and complicated and may include carrying extra linking equipment or a flash memory stick. In contradistinction, in the present invention, only two key strokes are required, i.e., pressing the search key and then pressing the numerical key associated with the desired printing device.

There are other examples of the benefits of the present invention, which generically allow the quick, easy and seamless transference of a communication from a mobile communication device to another piece of communication equipment. For example, a video clip attachment would be transferred for viewing on a monitor of a nearby personal computer 39. A video conference call could be transferred to a monitor, speakers and microphone of the nearby personal computer 39.

It is envisioned that the cellular telephone 3 would transfer a mode code to the server 17 along the unique RFID codes received by the interrogator 13. The mode code would indicate the present mode of the cellular telephone 3. For example, the mode code could indicate if the cellular telephone 3 is being used to view a text message, carry on a telephone conversation, participate in a video conference, etc.

The mode code would be used by the server 17 to discriminate which of the RFID codes to use in retrieving data from the memory 20. In other words, if the cellular telephone 3 is participating in a telephone conversation, the RFID codes received by the interrogator 13 relating to nearby desktop telephones 33 would be used by the server 17, and the RFID codes received by the interrogator relating to nearby printing devices 37, 45 would be ignored, since a telephone conversation cannot be transferred to a printing device 37, 45. Alternatively, if the mode code indicates that the cellular telephone 3 is being used to view text messages, the RFID codes received by the interrogator 13 relating to nearby printing devices 37, 45 would be used by the server 17, and the RFID codes received by the interrogator 13 relating to nearby desktop telephones 33 would be ignored, since a text message can not be transferred to a desktop telephone 33.

PUBLIC ENVIRONMENT

Figure 7:
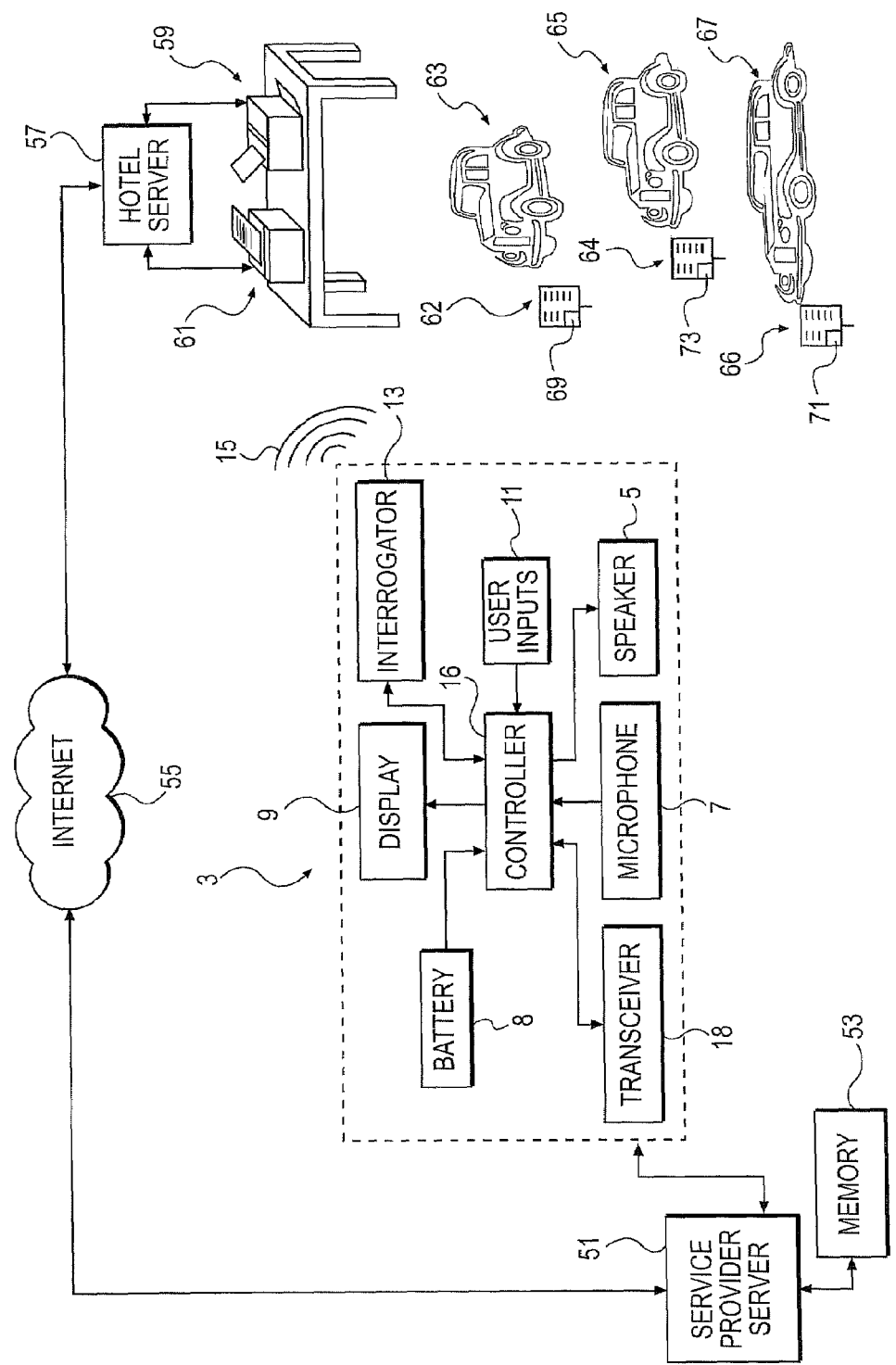
FIG. 7 is a block diagram illustrating various interacting components of the system of the present invention in a public environment.

FIG. 7 is a block diagram illustrating an interaction between the cellular telephone 3, a service provider server 51 and various objects that would be located in a public environment. The RFID labels 21, 23, 25, etc. would be attached to, or located adjacent to, various objects in the public environment. For example, a first RFID label 58 would be attached to a B&W printer 59 in a hotel lobby. A second RFID label 60 would be attached to a color laser printer 61 in the hotel lobby. The B&W printer 59 and the color laser printer 61 are connected to a hotel server 57, which is connected to the service provider server 51 via the Internet 55 or publicly switch telephone network (PSTN). A third RFID label 69 would be attached to a first information stand 62 near a first vehicle 63 on a showroom floor. A fourth RFID label 73 would be attached to a second information stand 64 near a second vehicle 65 on the showroom floor. A fifth RFID label 71 would be attached to a third information stand 66 near a third vehicle 67 on the showroom floor.

The operation of the system of FIG. 7 is similar to the operation as described above in conjunction with FIG. 4, wherein a user presses a designated key of the user inputs 11 of the cellular telephone 3, such as a "search" key to activate the interrogator 13 and transmit a unique RFID code to the service provider server 51. The advantages and useful nature of the system of the present invention illustrated in FIG. 7 will now be described with reference to several examples.

Assume a hotel guest is viewing a text message on her cellular telephone 3 and desires to have an immediate printout of the text message. In accordance with the present invention, the hotel guest would press the "search" key of the user inputs 11 of the cellular telephone 3. The interrogator 13 would at that time obtain the unique RFID codes associated with the labels 58 and 60 of the nearby printing devices 59 and 61, and transmit the same to the service provider server 51. The service provider server 51 would check the stored data in the memory 53 to locate information about the nearby printing devices 59 and 61. The service provider server 51 would find data in the memory 53 showing that the printing devices 59 and 61 are hosted by a hotel server 57 and have particular IP addresses. This data would have been previously stored in the memory 53 by an authorized service provider employee, perhaps for a fee charged to the hotel.

Since two printers 59 and 61 are proximate the hotel guest, the service provider server 51 would send the identifications of the two nearby printing devices to the controller 16 of the cellular telephone 3. FIG. 8 is an example of a menu, which would be displayed to the user via display 9 of cellular telephone 3. The identifications could also include a price per page for printing.

As can be seen in FIG. 8, the user is given the option to printout the text message using one of two printing devices. Pressing "2" on the numerical key pad of the cellular telephone 3 will cause a menu, as illustrated in FIG. 9, to appear on the display 9 of the cellular telephone 3. If the guest selects "1" on the numerical keypad of the cellular telephone 3, the text message, last viewed on the cellular telephone 3, will be printed on the printing device labeled "East Side B&W printer."

It is envisioned that the above system would be a subscription-based system. A hotel, coffee shop, library, etc. that wished to participate would register public printing devices with a cellular service provider, e.g. VERIZON, SPRINT, by providing an IP address for the device and perhaps a charge per page. The service provider would store this data in the memory 53. Cellular telephone users would also subscribe by registering a credit card and agreeing to the rules of the program. When printouts are made, the user's credit card on file would be charged by the service provider and a portion of the proceeds forwarded to the subscribing vendor, i.e. hotel, coffee shop, library.

There are other examples of the benefits of the present invention, which generically allow the quick, easy and seamless transference of a communication "to" a mobile communication device. For example, a car showroom or convention center may have several vehicles 63, 65, 67 on display. An information stand 62, 64, 66 may be placed proximate to each vehicle 63, 65, 67. On each information stand 62, 64, 66 there would be a brief description of the vehicle 63, 65, 67 and a label 69, 73, 71 stating "interrogate me for additional information." A subscriber of the service provider would understand this slogan to mean that the cellular telephone's interrogator 13 may be used to obtain additional information.

In accordance with the present invention, a subscriber would press the "search" key of the user inputs 11 of the cellular telephone 3. The interrogator 13 would at that time obtain the unique RFID codes associated with the labels 69, 73 and 71 of the nearby information stands 62, 64 and 66 and transmit the same to the service provider server 51. The service provider server 51 would check the stored data in the memory 53 to locate information about the nearby vehicles 63, 65, 67. The service provider server 51 would find text and/or graphical data in the memory 53 relating to the nearby vehicles 63, 65, 67. This data would have been previously stored in the memory 53 by an authorized service provider employee, perhaps for a fee charged to the vehicle manufacturer.

Since three vehicles 63, 65, 67 are proximate the subscriber, the service provider server 51 would send the identifications of the three nearby vehicles 63, 65, 67 to the controller 16 of the cellular telephone 3. FIG. 10 is an example of a menu, which would be displayed to the user via display 9 of cellular telephone 3 if four vehicles were nearby on the showroom floor.

As can be seen in FIG. 10, the subscriber is given the option to download information about one of the four vehicles. The downloaded information will be immediately viewable by the subscriber, and/or may be printed out at a later time as desired.

It is envisioned that the above system would be a subscription-based system. A vehicle manufacturer that wished to participate would provide the text and/or graphic information to a cellular service provider, e.g. VERIZON, SPRINT. The service provider would store this data in the memory 53 for a fee and provide the labels 21, 23, 25 58, 60, 69, 73, 71. Cellular telephone users might also subscribe by registering a credit card and agreeing to the rules of the program. When information was downloaded, such information could be free or for a charge.

There are limitless possibilities for such an information system, as described above. The obtainable information could relate to zoo animals and have been provided by the zoo to the service provider. In another example, the information could relate to a diner menu and include nutrient facts and ingredients or recipes, and have been provided by a restaurant to the service provider.

Although the present invention has been described in conjunction with an interrogator 13 for an RFID tag, other types of interrogators or scanners are possible. A preference in choosing an interrogator would be to select one which can scan tags at a distance, for example a bar code scanner-type interrogator would be capable of achieving several of the advantages of the present invention. Also, tags emitting unique frequencies or codes using infra-red (IR) light or inaudible sounds would also be possible alternatives.

Although the server 17 is shown in FIG. 4 communicating directly with the cellular telephone 3, the cellular telephone's communications could be routed through a cellular service provider to the server 17 via the publicly switch telephone network (PSTN), Internet or any other communication channel. Therefore, the communications of the cellular telephone 3 (conversation, email, fax, etc.) would be forwarded from the cellular service provider to the server 17 at the business, which would then forward the communication to the relevant piece of office equipment 33, 37, 39, 45.

Although the term "employees" has been used in portions of the description, the invention is equally applicable to students on a campus or users of a public building, such as a courthouse or library, etc.

Although FIG. 4 illustrated that a unique label 21, 23, 25 would be attached on a one-to-one basis to the office equipment, it should be appreciated that the benefits of the present invention could be accomplished even if fewer labels 21, 23 and 25 were provided. In other words, if three printing devices were located in a single room and one label with one RFID tag were provided for the single room, then the single RFID tag's code would be linked in the memory 20 to the three printing devices in the single room. Therefore, the user would be presented with a list of three printing devices on the display 9 of the cellular telephone 3, as shown in FIG. 6.

Likewise, in the public environment embodiment of FIG. 7, only one label would need to be provided in the vehicle showroom example. The RFID code of the one label would be linked to three or four vehicles, such that the menu of FIG. 10 would be sent to the display 9 of the cellular telephone 3. The subscriber would select the desired vehicle and information about only the desired vehicle would be downloaded from the memory 53 to the cellular telephone 3.

Also, the labels need not be directly associated with any particular object or group of objects. Rather, the RFID tags could relate to a physical location. A server could store a "mapping" of the office building or complex of office buildings. The mapping would include the fixed locations of numerous unique labels disposed throughout the complex, as well as, the fixed locations of the communication equipment. Relevant nearby communication equipment would be determined by a distance calculation, between the scanned label and the mapped location of the communication equipment.

In some systems, it may be possible to store sufficient data in the RFID code to fully identify the address or telephone number of the communication equipment. If so, it would no longer be required to obtain this information from the memory 20, 53. Rather, the server 17, 51 could receive the forwarding address or telephone number directly from the RFID code sent by the cellular telephone 3.

For example, the RFID code could specify a particular telephone number for a landline telephone or for a fax machine, and perhaps a code indicating the type of equipment, e.g., video telephone, voice only telephone, B&W fax machine, color fax machine. A user of a cellular telephone 3 would activate the interrogator 13 via one of the user inputs 11. The interrogator 13 would obtain the RFID code and pass this information on to the server 17 or 51, which would then forward the communication (e.g. conference call, fax, email) directly to the communication equipment identified by the telephone number. By this arrangement, there is no need for a database in a memory 20 or 53.

As another example, the RFID code could specify a particular Internet address for a printer, monitor, landline telephone or for a fax machine, and perhaps a code indicating the type of equipment, e.g., color printer, B&W printer, video telephone, voice only telephone, B&W fax machine, color fax machine. A user of a cellular telephone 3 would activate the interrogator 13 via one of the user inputs 11. The interrogator 13 would obtain the RFID code and pass this information on to the server 17 or 51, which would then forward the communication directly to the communication equipment identified by the Internet address. By this arrangement, there is no need for a database in a memory 20 or 53.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:
1. A mobile communication device comprising:
a controller;
user inputs connected to said controller; and
an interrogator connected to said controller for reading information from a local tag relating to a nearby piece of equipment, wherein the read information is transmitted to a remote service and wherein in response to the read information relating to the nearby niece of equipment being received by the remote service and in response to receiving a user input, a communication accessible at said mobile communication device is routed to the nearby piece of equipment.

2. The device of claim 1, wherein said interrogator is a radio frequency identification (RFID) tag scanner.

3. The device of claim 1, wherein said mobile communication device is a cellular telephone.

4. The device of claim 3, wherein said interrogator is activated to read information from a local tag when a user presses a button on said cellular telephone.

5. A method of transferring a communication from a mobile communication device to a fixed communication device comprising:
   receiving a communication at the mobile communication device from a remote service;
   activating an interrogator of the mobile communication device;
   reading a code from a tag in the local environment;
   transmitting the code to the remote service; and
   based on the code received at the remote service, transferring the communication from the remote service to the fixed communication device.

6. The method of claim 5, wherein said activating step includes pressing a button on the mobile communication device.

7. The method of claim 5, wherein said step of reading a tag includes receiving a radio frequency identification (RFID) from an RFID tag.

8. The method of claim 5, wherein the remote service is a service provider of cellular telephone services.

9. The method of claim 5, wherein the remote service is a server of a business and the fixed communication device is a printer or land line phone of the business.

10. The method of claim 5 including sending at least one selectable option to the mobile communication device based on the code received at the remote service and wherein transferring the communication comprises transferring the communication in response to a selection of the selectable option.

11. A mobile communication device comprising:
   a controller;
   user inputs connected to said controller; and
   an interrogator connected to said controller for reading information from a local tag relating to a nearby niece of equipment, wherein the read information is transmitted to a remote service and wherein in response to receiving a user input, a communication accessible at said mobile communication device is routed to the nearby piece of equipment;
   wherein the communication is an ongoing telephone conversation.

12. A mobile communication device comprising:
   a controller;
   user inputs connected to said controller; and
   an interrogator connected to said controller for reading information from a local tag relating to a nearby niece of equipment, wherein the read information is transmitted to a remote service and wherein in response to receiving a user input, a communication accessible at said mobile communication device is routed to the nearby piece of equipment;
   wherein the communication is a text message.

13. A mobile communication device comprising:
   a controller;
   user inputs connected to said controller; and
   an interrogator connected to said controller for reading information from a local tag identifying a piece of equipment associated with the local tag, wherein the controller causes the read information to be transmitted to a remote service, and wherein the remote service transfers a communication accessible at said mobile terminal to the piece of equipment associated with the local tag based on the tag information.

14. The device of claim 13, wherein said interrogator is a radio frequency identification (RFID) tag scanner.

15. The device of claim 13, wherein said mobile communication device is a cellular telephone.

16. The device of claim 13 wherein the piece of equipment is a telephone.

17. The device of claim 13 wherein the piece of equipment is a printer.

18. A method of transferring a communication from a mobile communication device to a fixed communication device comprising:
   providing a fixed communication device;
   providing a tag storing a code and being associated with the fixed communication device;
   receiving a communication at the mobile communication device from a remote service;
   activating an interrogator of the mobile communication device to read the code from the tag;
   transmitting the code to the remote service; and
   based on the code received at the remote service, transferring the communication from the remote service to the fixed communication device associated with the tag having the code.

19. The method of claim 18 wherein said received communication comprises a telephone call and said fixed communication device comprises a telephone.

20. The method of claim 18 including requiring a user input at the mobile communication device after transmitting the code to the remote service and before transferring the communication from the remote service to the fixed communication device.

* * * * *